United States Patent Office 3,454,548
Patented July 8, 1969

3,454,548
NOVIOSYLOXY COUMARIN CONTAINING
COMPOUNDS
John G. Keil, Manlius, and Irving R. Hooper, Fayetteville, N.Y., assignors to Bristol-Myers Company, New York, N.Y., a corporation of Delaware
No Drawing. Filed Mar. 20, 1967, Ser. No. 624,153
Int. Cl. C08b *19/00;* C07g *3/00;* C07d *7/28*
U.S. Cl. 260—210                    11 Claims

ABSTRACT OF THE DISCLOSURE

Coumermycin $A_1$ and coumermycin $A_2$ (U.S. Patent 3,201,386) are transformed into valuable intermediates by selectively degrading the parent molecule by the process described herein. For example, coumermycin $A_1$ is treated with benzyl chloroformate to produce a bis-carbobenzoximide derative (II), said derivative being cleaved by refluxing in pyridine to produce 3-carbobenzoxamido-4-hydroxy-8-methyl-7-[3-O-(5-methyl - 2 - pyrrolylcarbonyl)noviosyloxy]coumarin (III). Compound III is catalytically hydrogenated to produce 3-amino-4-hydroxy-8-methyl-7-[3-O-(5-methyl - 2 - pyrrolylcarbonyl)noviosyloxy]coumarin (IV), a valuable intermediate in the preparation of potent new antibiotic substances, an example of which is 3-benzamido-4-hydroxy-8-methyl-7-[3-O-(5-methyl - 2 - pyrrolylcarbonyl)noviosyloxy]coumarin (I).

BACKGROUND OF THE INVENTION

Field of the invention

This invention relates to chemical compounds useful, for example, in the preparation of antibacterial agents and, more particularly, to the bis-carbobenzoximide of coumermycin $A_1$, 3-carbobenzoxamido - 4 - hydroxy-8-methyl-7-[3-O-(5-methyl - 2 - pyrrolylcarbonyl)noviosyloxy]coumarin and 3-amino-4-hydroxy-8-methyl-7-[3-O-(5-methyl - 2 - pyrrolylcarbonyl)noviosyloxy]coumarin, all of which are useful, for example, in the ultimate preparation of potent antibiotic substances.

Description of the prior art

The compounds of the instant invention and their usefulness as intermediates in the preparation of the corresponding 3-benzamido - 4 - hydroxy-8-methyl-7-[3-O-(5-methyl - 2 - pyrrolylcarbonyl)noviosyloxy]coumarins were heretofore unknown in the art.

SUMMARY OF THE INVENTION

The compounds of the present invention, examples of which follow, are prepared by the process which comprises the consecutive steps of (a) mixing together a compound having the formula

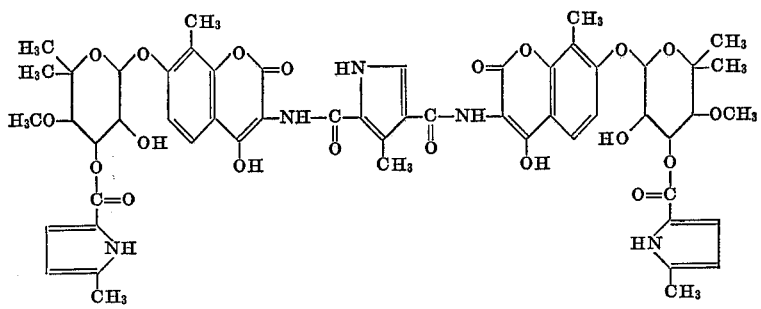

with benzyl chloroformate to produce a bis-carbobenzoximide (II) having the formula

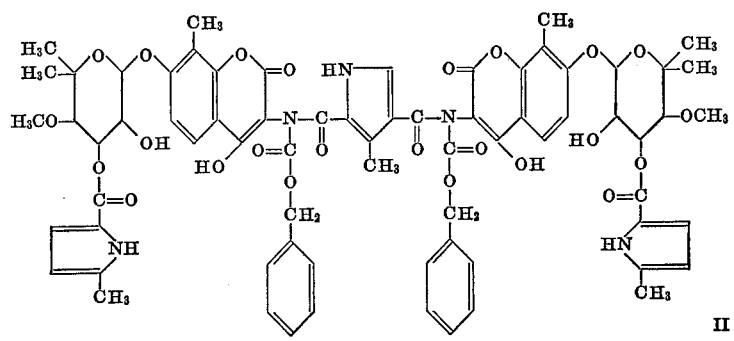

II and (b) warming the bis-imide (II) with pyridine to produce a 3-carbobenzoxamido compound having the formula

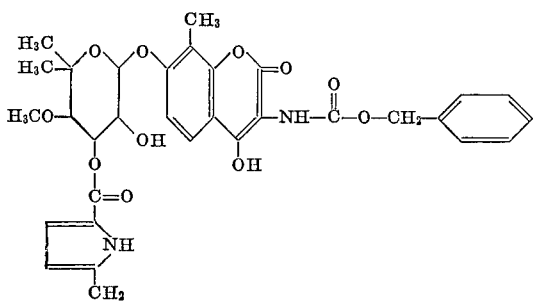

III and (c) catalytically hydrogenating (III) to produce a compound having the formula (IV)

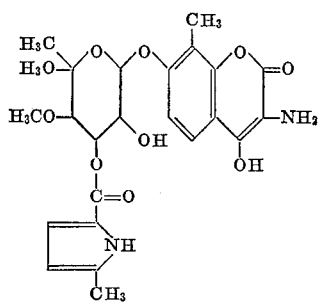

IV

DISCLOSURE

This invention relates to derivatives of coumermycin $A_1$ and coumermycin $A_2$ (U.S. Patent 3,201,386) and to the processes for their production. More particularly it relates to intermediates obtained from coumermycin $A_1$ or $A_2$ which are valuable in the preparation of antibiotic substances.

Coumermycin $A_1$ (R' is methyl) and coumermycin $A_2$ (R' is hydrogen)

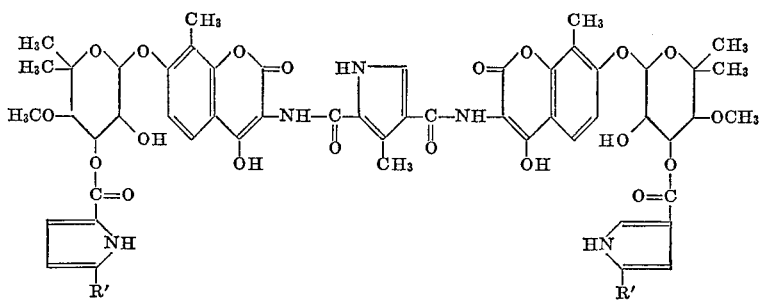

are effective in inhibiting the growth of Gram-positive bacteria. Both are nontoxic and exhibit a therapeutic effect on mice infected with Gram-positive bacteria. A major disadvantage of the coumermycins however is their poor absorption and resultant low blood levels. Efforts to correct these deficiencies have resulted in new and novel N-benzoyl cleavage products of the parent coumermycins, said compounds being antibacterial agents active against *Staphylococcus aureus* Smith. (U.S. patent application No. 583,984), filed on Nov. 2, 1966 and now abandoned. They are characterized as having the formula

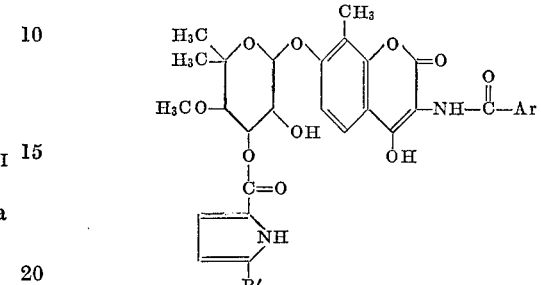

I wherein R' is either hydrogen or methyl, and Ar is a group having the formula

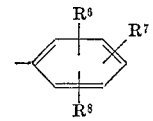

in which each of $R^6$, $R^7$ and $R^8$ represents hydrogen, fluoro, chloro, bromo, iodo, trifluoromethyl, trichloromethyl, amino, N-(lower)alkylamino, N,N-di(lower)alkylamino, nitro, cyano, (lower)alkyl, (lower)alkoxy, hydroxy, carboxamido, N - (lower)alkylcarboxamido, N,N-di(lower)alkylcarboxamido, carboxy, carb(lower)alkoxy, acetoxy, mercapto, thioacetoxy or (lower)alkylthio; and the nontoxic, pharmaceutically acceptable cationic salts thereof.

The present disclosure teaches a new process for the preparation of compounds of Formula I and is more particularly directed to the new intermediate compounds produced in the practice of the process of the present invention.

Within the scope of the present invention is the process which comprises the consecutive steps of mixing together a compound having the formula

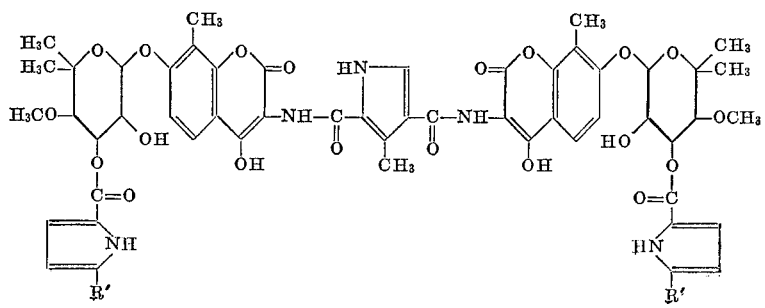

or a cationic salt or tetrahydropyranyl ether thereof wherein R' is hydrogen or methyl, with a benzyl haloformate having the formula

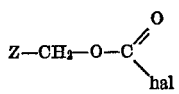

wherein hal is chloro, bromo or iodo, and Z is a group having the formula

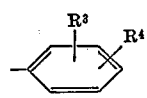

in which $R^3$ and $R^4$ are alike or different and each represent hydrogen, fluoro, chloro, bromo, cyano, (lower)alkyl, (lower)alkoxy, nitro, or the like;

To produce a compound having the formula

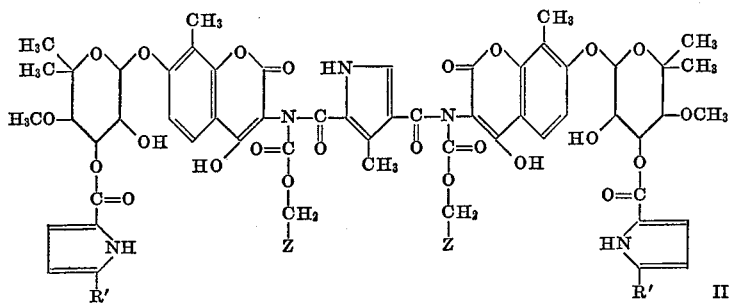

wherein R' is hydrogen or methyl, Z being as defined above.

Warming the isolated bis-imide (II) in proton accepting organic solvent at 50° C. overnight, or by refluxing in said solvent for a time of about three hours, results in the formation of compounds having the formula

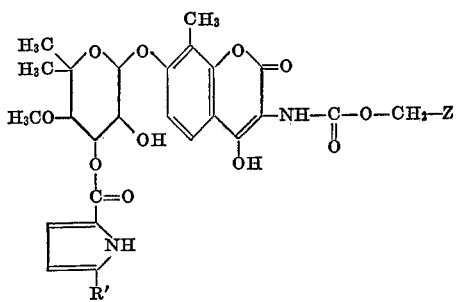

wherein R' and Z are as described above.

Catalytically hydrogenating compound III produces a compound having the formula

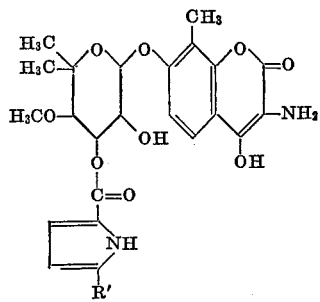

wherein R' is hydrogen or methyl.

A preferred embodiment of the present invention comprises the compounds having the Formula II, wherein R' is methyl and Z is a group having the formula

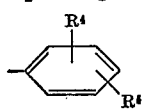

wherein $R_4$ and $R_5$ each represent hydrogen, fluoro, chloro, bromo, nitro, cyano, (lower)alkyl, (lower)alkoxy, or some other equivalent substitution.

Another preferred embodiment of the present invention comprises the compounds having the Formula III, wherein R' is methyl and Z is a group having the formula

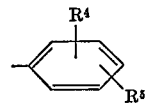

wherein $R_4$ and $R_5$ each represent hydrogen, fluoro, chloro, bromo, nitro, cyano, (lower)alkyl, (lower)alkoxy, or some other equivalent substitution.

A more preferred embodiment of the present invention comprises the compound having the formula II, wherein R' is methyl and Z is phenyl.

Another more preferred embodiment of the present invention comprises the compound having the Formula III, wherein R' is methyl and Z is phenyl.

The most preferred embodiment of the present invention comprises the compound having the Formula IV, wherein R' is methyl, and includes the stable acid addition salts thereof, i.e., hydrochloride, sulfate, phosphate, nitrate, tartrate, citrate, oxalate, and the like.

The term "(lower)alkyl" as used herein means both straight and branched chain aliphatic hydrocarbon radicals having from one to eight carbon atoms such as methyl, ethyl, propyl, isopropyl, butyl, isobutyl, t-butyl, amyl, hexyl, etc. Where the term "(lower)" is used as part of the description of another group e.g. "(lower)alkoxy," it refers to the alkyl portion of such group which is therefore as described above in connection with "(lower)alkyl" and thus includes such radicals as methoxy, ethoxy, isopropoxy, etc.

Compound IV, where R' is either hydrogen or methyl, but preferably methyl, is an extremely valuable intermediate in the preparation of compounds having the Formula I. As was mentioned previously, compounds of Formula I are most useful as antibacterial agents and, as such, are most valuable as nutritional supplements in animal feeds, as agents for the treatment of mastitis in cattle, as therapeutic agents in poultry and animals, including man, in the treatment of infectious diseases caused by Gram-positive bacteria, especially *Staphylococcus aureus* and other penicillinase producing bacteria, and sometimes those infections caused by Gram-negative bacteria. They are well absorbed and produce good blood levels upon oral or parenteral administration to mammals.

The utility of compound IV, the most preferred embodiment, is in the process of preparing compounds of Formula I. One equivalent of compound of Formula IV is preferably mixed with about 1 to 2 equivalents of an acid halide having the formula

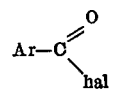

wherein Ar is as defined above, and hal is chloro, bromo or iodo, or with its functional equivalent as an acylating agent for a primary amine, in the presence of a proton accepting solvent system at about 25° C. for about 24 hours to produce compounds having the Formula I.

The objectives of the present invention have been achieved, by the provision according to the present invention, of the process for the synthesis of compounds having the formula

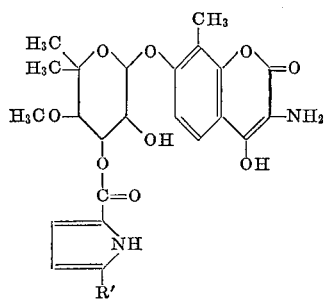

wherein R' is either hydrogen or methyl, which comprises the consecutive steps of (a) mixing together a compound having the formula

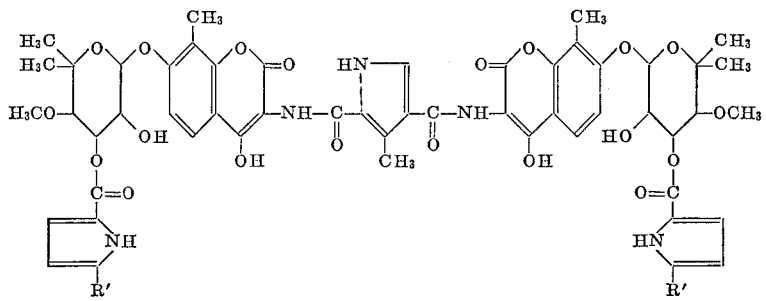

or a cationic salt or tetrahydropyranyl ether thereof,

Wherein R' is hydrogen or methyl; with a benzyl haloformate having the formula

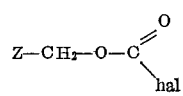

Wherein hal is chloro, bromo or iodo, and in which Z is a group having the formula

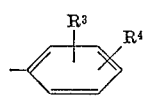

In which R³ and R⁴ are alike or different and each represent hydrogen, fluoro, chloro, bromo, nitro, cyano, (lower)alkyl, (lower)alkoxy, or the like.

In a homogeneous or heterogeneous system capable of inactivating protons, said system comprising an inorganic or organic base selected from the group consisting of an alkali carbonate or bicarbonate, alkali earth metal carbonate or bicarbonate, a pyridine or a tri(lower)alkylamine, alone or in combination with an inert solvent selected from the group consisting of tetrahydrofuran, benzene, toluene, xylene, ether, chloroform, etc., but preferably in a solvent system comprising a tri(lower)alkyl-amine alone or in combination with an inert solvent.

At a temperature in the range of −20° C. to 50° C., but preferably in the range of −5° C. to about 25° C. to produce a compound characterized as a bis-imide having the formula

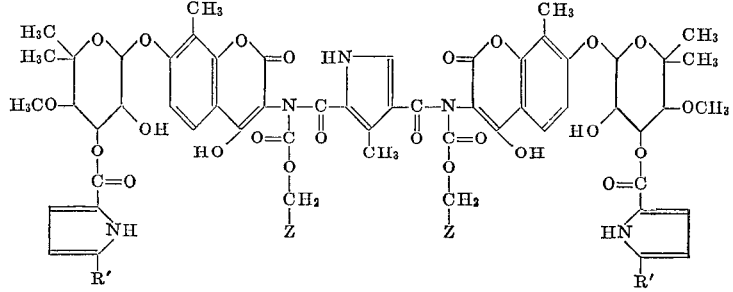

wherein R' and Z are as described above; and (b) Warming said isolated bis-imide in the presence of an anhydrous or water-wet, proton-accepting solvent (organic nucleophile), usually selected from the group consisting of a pyridine, or (lower)trialkylamine such as trimethylamine, triethylamine, but preferably pyridine, or one of these in combination with an inert solvent, an example of which may be tetrahydrofuran, benzene, toluene, xylene, chloroform or ether, At a temperature in the range of 30° C. to the boiling point of the solvent system, but preferably in the range of 40–70° C.

For a period of time of about 2 to 50 hours, but preferably about 24 hours,

To produce a 3-carbobenzoxamido compound having the formula

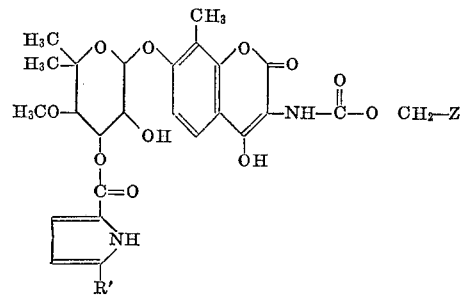

wherein R' and Z are as described above; and (c) Catalytically hydrogenating the isolated 3-carbobenzoxamido compound using standard hydrogenation technique, preferably palladium or platinum oxide in glacial acetic acid at room temperature, to produce a compound having the formula

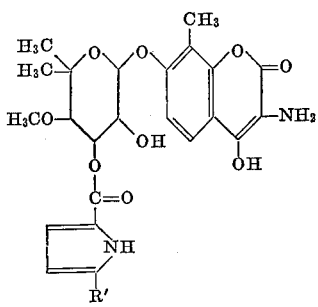

wherein R' is H or methyl.

The process can be conducted under varying conditions, the most critical being the temperature at which the carbobenzoxylation step is performed.

The process, at temperatures in the range of −25 to 25° C., is usually performed by dissolving or suspending coumermycin $A_1$ or coumermycin $A_2$ or soluble salts thereof, i.e., sodium, potassium, or the tetrahydropyranyl ethers thereof, in a proton accepting solvent (organic nucleophile) usually selected from the group consisting of a (lower) trialkylamine such as trimethylamine, triethylamine, or one of these in combination with an inert solvent, an example of which may be tetrahydrofuran, benzene, toluene, xylene, chloroform, or ether. The mixture is cooled to about 10° C. by an ice-water bath. An excess of an unsubstituted or substituted benzyl haloformate, preferably in a ratio of two to four moles of acylating agent to one mole of coumermycin, is added with vigorous stirring. Stirring is maintained for several hours following which the solution is concentrated to a syrup by evaporation in vacuo at temperatures below 25° C. The material isolated by this technique is characterized as a bis-imide (II).

Warming the isolated bis-imide (II) in a proton accepting organic solvent from the group described above at about 40–70° C. overnight, or by refluxing in said solvent for a time of about three hours, results in the formation of compounds having the Formula III.

The process, at temperatures above 25° C., and up to the boiling point of the solvent employed, is usually performed by dissolving or suspending coumermycin $A_1$ or coumermycin $A_2$ or the soluble salts thereof, or the tetrahydropyranyl ethers thereof, in a proton accepting solvent (organic nucleophile) usually selected from the group consisting of a (lower)trialkylamine such as trimethylamine, triethylamine; or one of these in combination with an inert solvent, an example of which may be tetrahydrofuran, benzene, toluene, xylene, chloroform or ether.

An excess of an unsubstituted or substituted benzyl haloformate, preferably in a ratio of two to four moles of acylating agent to one mole of coumermycin, is added to the mixture with vigorous stirring. The resultant mixture is slowly warmed to temperatures up to the boiling point of the solvent employed for a period of time usually in excess of thirty minutes but rarely longer than 3 hours, during which time the solution turns orange to brown in color. The solution is evaporated in vacuo to a syrup and poured into vigorously stirred ice-water. The crystalline product collected is characterized as material of Formula II.

As in the procedure as practiced at temperatures below 25° C., the isolated bis-imide (II) was warmed in a proton-accepting organic solvent selected from the group described above, preferably in pyridine, at about 40–70° C. for several hours, to produce product characterized by Formula III in addition to lesser quantities of materials characterized as having the formulas

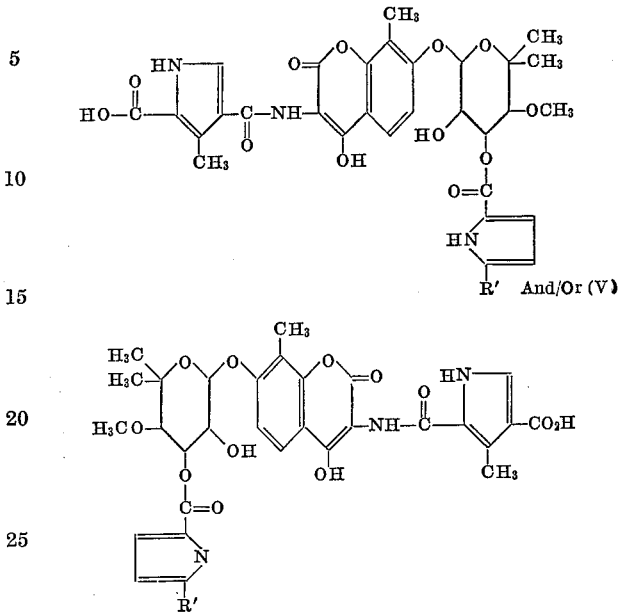

The resultant mixture obtained from the process by either the high or low temperature procedure is subsequently separated into its component parts, the major one of which is material of Formula III. Methods satisfactory for said separation include fractional crystallization, chromatography, extraction and other such equivalents. Because of the generally good solubility of compounds of Formula III in chloroform, as compared to that of Compounds II, and V, it was relatively simple to extract Compound III from the whole by continuous chloroform extraction in a Soxhlet apparatus. Subsequent concentration of the chloroform extracts, followed by bicarbonate washings, drying over sodium sulfate, and precipitation using Skellysolve B produced purified material of the Formula III.

Purified Product III, possessing an activated amide linkage at the 3-position of the coumarin moiety, is readily susceptible to hydrogenolyssis. Catalytic hydrogenation cleaves the nitrogen-carbonyl bond of the amide to produce the free amine, Product IV.

As a general procedure, Product III was dissolved in a suitable solvent for hydrogenation such as acetic acid, a (lower)alkanol, benzene, tetrahydrofuran, etc., but preferably acetic acid, to which was added a catalyst such as palladium, platinum oxide, nickel, or some similar equivalent metal catalyst that would be used in the catalytic reduction of an aldehyde, ketone or unsaturated hydrocarbon. Hydrogen is properly introduced into the hydrogenation apparatus and the reduction run at high or low pressure, but preferably low pressure, in the temperature range of about −10° C. to about 50° C., but preferably at about room temperature, with adequate agitation until the uptake of hydrogen ceases or the theoretical amount of hydrogen is absorbed.

The catalyst is immediately removed by filtration in a nitrogen atmosphere and the solution evaporated in vacuo to dryness to yield a yellow-gold product. Recrystallization from ethyl acetate-Skellysolve B produces good quality product of Formula IV. The product of Formula IV is susceptible to oxidation and should be stored in a dark container with a nitrogen atmosphere. It produces a strong positive Ninhydrin test (intense sky-blue color) and readily reacts with acylating agents such as acid chlorides to produce compounds of Formula I.

It is a preferred embodiment in the process of preparing compounds of Formula IV to use coumermycin $A_1$ or coumermycin $A_2$ in their free acidic form, or as their soluble cationic salts, i.e., potassium, sodium, or the like. However, it is also possible to use the tetrahydropyranyl (THP) ethers of coumermycin $A_1$ or coumermycin $A_2$ in the process and obtain comparable results to those of the preferred embodiment.

When the tetrahydropyranyl ethers are used, the process is slightly modified to include the additional step of cleaving the tetrahydropyranyl group from the molecule. This additional step is carried out following the recovery of product of Formula II. This THP-bis-imide (II) is usually dissolved or suspended in a (lower)alkanol, or (lower) alkanol-tetrahydrofuran solvent system, along with a catalytic amount of p-toluene sulfonic acid, and stirred at room temperature for 10–50 hours to effect cleavage of the THP group to yield the bis-imide of Formula II. The process is then continued as detailed above.

PREPARATION OF THE TETRAHYDROPYRANYL ETHERS OF COUMERMYCIN $A_1$ OR $A_2$

Pure coumermycin $A_1$ or coumermycin $A_2$ is mixed together with excess dihydropyran in the presence of an acid catalyst and an inert solvent to yield mixtures of mono, di, tri and tetra-tetrahydropyranyl ether derivatives of coumermycin $A_1$ or $A_2$ respectively.

More specifically, a coumermycin is mixed together with dihydropyran in various molar proportions, but preferably in a ratio of one mole of coumermycin to more than 20 moles of dihydropyran.

The addition of a suitable acid to the coumermycindihydropyran mixture as a catalyst is essential. The acid employed is usually selected from the group consisting of p-toluene-sulfonic acid, hydrochloric acid, etc.

The quantity of the acid employed as the catalyst is usually determined by the reaction conditions, the bulk of the catalyst and the amount at which the optimum yield of product is obtained.

The reaction may be conducted with or without the use of a co-solvent, the co-solvent usually being employed to increase the solubility of the reactants and reduce the viscosity of the mixture. The co-solvent used is inert and is usually selected from the group consisting of tetrahydrofuran, dioxane, diethyl ether, the dipropyl ethers, the dibutyl ethers, benzene, xylene and toluene.

The reaction is exothermic. Its temperature can be carefully controlled or it can be allowed to seek its own level without substantial differences in the end result. The process is usually conducted at a temperature of 0°–100° C., but preferably in the temperature range of 25° to 60° C. for a period of time dependent upon the temperature used and ultimately upon the completion of reaction and the yields obtained.

As mentioned previously, the process usually results in the formation of mixtures of mono, di, tri and tetra-substituted tetrahydropyranyl ether derivatives of the coumermycins. The ratio of the components of the mixture however, is largely dependent upon the reaction conditions, and most particularly the method of work-up and purification of same.

When the reaction is conducted at elevated temperatures of 60–80° C. for 2 to 4 hours, or at lower temperatures for longer periods of time, under very anhydrous conditions, followed by purification in the absence of polar solvents, there is obtained a product consisting of 80 to 99% pure 2′,2′,4,4-O,O,O,O-tetratetrahydropyranylcoumermycin. The other possible tetrahydropyranylcoumermycins are usually found in the following order of their relative concentration: 2′,2′,4-O,O,O-tritetrahydropyranyl> 2′,2′-O,O-ditetrahydropyranyl> 2′-O-monotetrahydropyranyl> coumercycin.

When the reaction is conducted at lower temperatures, or for shorter periods of time, or under conditions *not* as anhydrous, the proportion of the 2′,2′,4,4-O,O,O,O-tetratetrahydropyranylcoumermycin in the mixture decreases as the proportion of the other tetrahydropyranyl ethers increases.

It is a fact that the tetrahydropyranyl moiety attached to either or both 4-O-positions of the coumermycin molecule is quite labile in the presence of polar solvents. When 2′,2′,4,4-O,O,O,O-tetratetrahydropyranylcoumermycin or 2′,2′,4-O,O,O-tritetrahydropyranylcoumermycin is crystallized or recrystallized from a hot alcoholic solvent system, the 4-O-tetrahydropyranyl ether functions are cleaved to 4-hydroxyl functions to yield pure 2′,2′-O,O-ditetrahydropyranylcoumermycin. The 2′-O-tetrahydropyranyl ether functions are generally stable when crystallization is carried out in the absence of acidic materials.

Resolution of mixtures of the tetrahydropyranyl ether derivatives can be accomplished by counter-current distribution purification. As a practical matter, the material is suitable as a mixture of di, tri and tetra-tetrahydropyranylcoumermycin, or it can be crystallized from a hot alcoholic solvent system to yield pure 2′,2′-O,O-ditetrahydropyranylcoumermycin, for use as an intermediate in its ultimate conversion to the N-benzoyl cleavage products of the present invention.

The assay used in the examples below is the standard coumermycin $A_1$ assay which is run on Petri plates prepared by using ten ml. of Baltimore Biological Laboratories (BBL) base agar and a top layer of four ml. of BBL seed agar innoculated with *Staph. aureus* ATCC 6538 P. The plates are incubated for 18 hours at 30° C. A standard activity curve for coumermycin $A_1$ is determined by using concentrations in the range of 0.07 to 1.5 $\mu$g./ml.

In the instant invention, use of the word coumermycin, without specifically stating coumermycin $A_1$ or $A_2$, shall be taken to mean either Coumermycin $A_1$ or $A_2$.

Di-, tri-, and tetra-tetrahydropyranylcoumermycin $A_1$ mixture and its resolution Coumermycin $A_1$ was stirred with tetrahydrofuran (THF) at room temperature until dissolution occurred. Dihydropyran (DHP) was added followed by Amberlyst 15 (H+) resin (containing less than 0.5% $H_2O$). As stirring continued, additional DHP was added. A gel formed that re-dissolved after one to two hours. Stirring was continued overnight at room temperature during which time the solution darkened to an orange-brown color.

The Amberlyst resin was removed by filtration and the solution concentrated in vacuo to a syrup. Dilution of the syrup with a minimal quantity of methanol yielded a crude solid (85–95% of theory). The solid was dried in vacuo. Thin layer chromatography indicated the solid consisted of at least three zones ($R_f$ 0.60–0.70) when resolved using 9:21:8 (parts by volume) of methyl acetate: 2-propanol: concentrated $NH_4OH$.

A Craig counter-current distribution separation was run on a 15 g. sample of the mixture using ½ volume upper phase to 1 volume lower phase from a system of 5:1:5:1 of $CCl_4$:$CHCl_3$:$CH_3OH$:$H_2O$ over 1001 transfers, 97.5% of the solid being recovered in total. The recoveries by evaporation and subsequent crystallization from the major concentrations as determined by Ultra Violet absorption at 345 m$\mu$ were as follows:

2′,2′,4,4-O,O,O,O-tetratetrahydropyranylcoumermycin $A_1$.

The tetra-substituted tetrahydropyranyl ether of coumermycin $A_1$ was recovered from tubes 21 through 40 as a pure crystalline solid, 3.68 g., M.P. decomposition above 200° C.

*Analysis.*—Calc'd for $C_{75}H_{91}N_5O_{24}$: C, 62.27; H, 6.34; N, 4.84. Found: C, 62.03; H, 6.31; N, 4.94.

2′,2′,4,-O,O,O-tritetrahydropyranylcoumermycin $A_1$.

The tri-substituted tetrahydropyranyl ether of coumermycin $A_1$ was recovered from tubes 41–70 as a pure crystalline solid, 3.8 g., M.P. decomposition above 200° C.

*Analysis.*—Cal'd for $C_{70}H_{83}N_5O_{23}$: C, 61.71; H, 6.14; N, 5.14. Found: C, 61.65; H, 6.19; N, 5.34.

2',2',-O,O-ditetrahydropyranylcoumermycin $A_1$

The di-substituted tetrahydropyranyl ether of coumermycin $A_1$ was recovered from tubes 71–100 as a pure crystalline solid, 1.8 g., M.P. decomposition above 200° C.

*Analysis.*—Calc'd for $C_{65}H_{75}O_{22}N_5$: C, 61.06; H, 5.91; N, 5.47. Found: C, 61.00; H, 5.83; N, 5.56.

2'-O-monotetrahydropyranylcoumermycin $A_1$.

The mono-substituted tetrahydropyranyl ether of coumermycin $A_1$ was recovered from tubes 101–130 as a pure crystalline solid, 1.6 g., M.P. decomposition above 200° C.

*Analysis.*—Calc'd for $C_{60}H_{65}N_5O_{21}$: C, 60.35; H, 5.66; N, 5.86. Found: C, 60.42; H, 5.81; N, 5.83.

Coumermycin $A_1$ was recovered unreacted from tubes 300–499, 1.5 g., M.P. decomposition 240–245° C.

2',2'-O,O-ditetrahydropyranylcoumermycin $A_1$ (direct method).

Coumermycin $A_1$ (1110.06 g., 1.0 mole) was slurried in a mixture of 11.2 liters of dry THF and 11.2 liters of dry DHP. p-Toluenesulfonic acid monohydrate (2.2 g.) was added and the solution was stirred for twenty hours at room temperature. The solution was concentrated to ⅓ of the volume in vacuo at less than 40° C., filtered and the filtrate poured into 134 liters of dry methanol at 0° C. The product crystallized upon stirring for 30 minutes at 0–5° C. and was collected by filtration. The filter cake was covered by dry solvent at all times while washing same with 10 liters of dry, cold methanol, followed by 5 liters of petroleum ether.

Recrystallization from hot methanol yielded the desired 2',2'-O,O-ditetrahydropyranyl ether.

DESCRIPTION OF THE PREFERRED EMBODIMENTS

The following examples will serve to illustrate but not to limit the present invention.

In the *Staphylococcus aureus* plate assays referred to below, the standard was pure coumermycin $A_1$ having an assigned potency of 1000 mcg./mg.

EXAMPLE 1

Bis-carbobenzoximide of coumermycin $A_1$.

METHOD 1

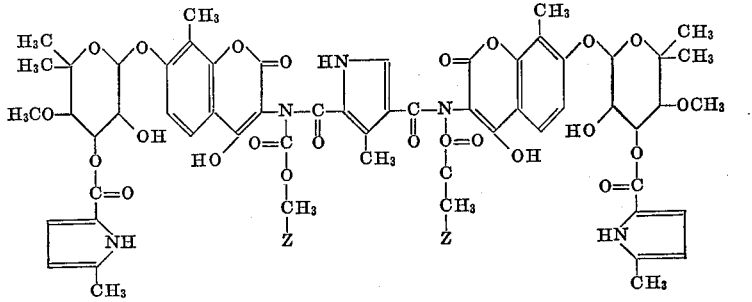

Monosodium coumermycin $A_1$ (60 g., 0.053 mole) was dissolved in 1250 ml. of tetrahydrofuran (THF) with slight warming on a steam bath. After allowing the deep yellow-gold solution to cool to 25° C., 44.6 ml. of triethylamine (6 equivalents) was carefully added with vigorous stirring. The mixture immediately started to gel, although rapid stirring kept the gel mobile.

Five equivalents (36 ml.) of benzylchloroformate, diluted to 250 ml. volume with THF, was added dropwise to the vigorously stirred gel-solution at 25° C. over a 30 minute period.

After one hour, the gel disappeared and the presence of triethylamine hydrochloride precipitate was noted. The stirring of the yellow solution was continued at 25° C. for an additional 24 hours.

The solution was filtered to remove the triethylamine hydrochloride, and then concentrated in vacuo to approximately one-tenth its original volume. The light yellow-orange solution was poured into 3000 ml. of Skellysolve-B with vigorous stirring. An immediate precipitate of a light creme-colored solid appeared. After stirring for one hour at 25° C. it was filtered, washed with four 100 ml. portions of n-hexane, and dried to yield 77.4 g. of semi-pure bis-carbobenzoximidocoumermycin $A_1$ (as illustrated above). M.P.: Softens at 145–150° C., decomposes with effervescence at 190–200° C. It is probable that this solid, consisting mainly of the desired product, was contaminated by small quantities of tri- and tetra-substituted carbobenzoxy side products, since one or both of the 4-hydroxyl functions of the coumarin moieties of coumermycin $A_1$ is capable of being carbobenzoxylated as well. It is noted however, that these small quantities of side products do not interfere with the subsequent steps of the process and are either eliminated or converted back to desired product as a matter of course as the process is practiced. The infrared spectrum (IR) of the solid product showed a very weak amide II band near 1530 cm.$^{-1}$ indicating the presence of little, if any, starting material. Staph. aureus plate assay 2.5 to 5.0 mcg./mg.

EXAMPLE 2

Bis-carbobenzoximide of coumermycin $A_1$

METHOD 2

A solution of 11.0 g. of coumermycin $A_1$ in 300 ml. of 4:1 tetrahydrofuran (THF) triethylamine was treated with 7.0 g. of benzyl chloroformate by careful addition with efficient stirring at 25°. The reaction mixture was protected from the atmosphere and stirred at 25° for 77 hours. The color changed from a light yellow to deep scarlet during this time. The reaction mixture was concentrated to ⅓ volume in vacuo at 40° C. and stored at 4° C. for 16 hours. It was poured into 1000 ml. of ice water with vigorous stirring and acidified to pH 1.5 with 250 ml. of 6 N hydrochloric acid. The mixture was stirred at 0–5° C. for 2 hours and the resulting rose-colored solid was separated by filtration and washed with five 100 ml. portions of water. Thorough drying in vacuo gave 13.6 g. of amorphous solid that was identical to that obtained in the procedure of Example I.

EXAMPLE 3

Bis-carbobenzoximide of coumermycin $A_1$

METHOD 3

A solution of 15.0 g. of tetrahydropyranylcoumermycin $A_1$ in 350 ml. 6:1 of THF-triethylamine was treated with 7.0 g. of benzyl chloroformate. The reaction mixture was protected from the atmosphere and stirred at 25° C. for 30 hours. The mixture was concentrated in vacuo at 40° C. to 50 ml. of dark orange-brown syrup. It was poured into 1.00 liter of water with vigorous stirring, and the pH was adjusted to 1.5 with 200 ml. of 6 N hydrochloric acid while cooling in ice at 0–5° C. The resulting suspension was stirred at 0° C. for 2.0 hours and the amorphous solid was filtered off. The total crude product, after thorough drying, was dissolved in a mixture of 90 ml. of acetone, 370 ml. of methanol, and 1.8 ml. of 2,2-dimethoxypropane, and 930 mg. of p-toluenesulfonic acid monohydrate was added. The clear red solution was stirred at 25° for 25 hours and then evaporated to dryness at 40° in vacuo to yield crude title product that was suitable for use in the next step of the process as described in Example 4. Infrared spectral analysis indicated the THP groups were completely cleaved from the bis-imide.

EXAMPLE 4

3-carbobenzoximido-4-hydroxy-8-methyl-7-[3-O-(5-methyl-2-pyrrolylcarbonyl)noviosyloxy]coumarin

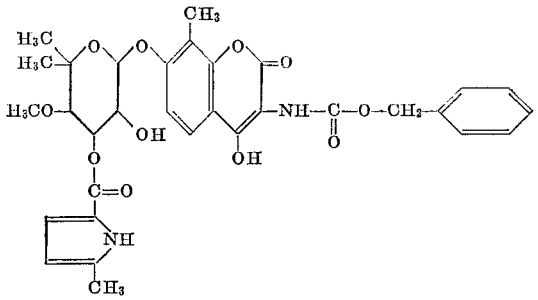

Seventy-five g. of the bis-carbobenzoximide of coumermycin $A_1$ obtained in Example I was dissolved in 1200 ml. of pyridine at 25° C. to make a light orange-colored solution. It was warmed to 50–55° C. for at least 24 hours during which time it was stirred.

The resultant orange-brown solution was concentrated in vacuo to about one-fifth its original volume and was poured into 3000 ml. of ice water with vigorous stirring. The pH was adjusted to pH 1–2 with 6 N hydrochloric acid, then stirred for an additional hour.

The suspension was filtered to yield 57.9 g. of light cream-tan colored solids which were dried in vacuo to constant weight.

The carbobenzoxamido derivative is quite chloroform-soluble while the undesired side products are not. The whole solids (50.0 g.) were placed in a Soxhlet extraction apparatus and continuously extracted until the materials extracted from the whole became negligible. Evaporation of the chloroform extracts produced approximately 15 g. of chloroform soluble materials. This residue was redissolved in a small portion of chloroform and extracted with 5% aqueous sodium bicarbonate to remove any acidic impurities. The chloroform solution was dried over anhydrous sodium sulfate and fractionally precipitated from solution by the addition of increasing amounts of Skellysolve-B (petroleum solvent, B.P. 60–68° C., essentially n-hexane) to yield a pure fraction, 4.5 g., of material identified as 3-carbobenzoximido-4-hydroxy-8-methyl - 7 - [3 - O - (5-methyl-2-pyrrolylcarbonyl)noviosyloxy]coumarin as a white, crystalline solid, M.P.: softens at 110° C., gelling at 125° C., melts with effervescence at 155–160° C.

The infrared (IR) and nuclear magnetic resonance (NMR) spectra were consistent with the structure of the title compound. *Staph. aureus* plate assay 90 to 110 mcg./mg.

*Analysis.*—Calc'd for $C_{32}H_{34}O_{11}N_2$: C, 61.73; H, 5.51; N, 4.50. Found: C, 61.14; H, 5.65; N, 4.83.

EXAMPLE 5

3-amino-4-hydroxy-8-methyl-7-[3-O-(5-methyl-2-pyrrolylcarbonyl) - noviosyloxy]coumarin. (Platinum oxide catalyst)

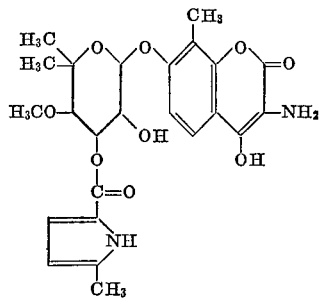

3 - carbobenzoxamido-4-hydroxy-8-methyl-7-[3-O-(5-methyl-2-pyrrolylcarbonyl)noviosyloxy]coumarin (1.8 g., 2.90 mmoles), obtained from Example 4, was dissolved in 150 ml. of glacial acetic acid to produce a pale yellow solution. To this solution was added 500 mg. of platinum oxide catalyst and the resultant solution-suspension treated with hydrogen in a Parr hydrogenation apparatus at an initial pressure of 52.5 lb./in.² The reduction was run for 24 hours at room temperature with agitation. The total uptake of hydrogen was 15.7 lb./in.²

The catalyst was removed by filtration over a filter-aid pad under a nitrogen atmosphere, and the solution was immediately evaporated in vacuo. Twenty ml. of acetone was added to the residue and it was again evaporated to dryness in vacuo. The procedure was repeated 4 more times. The resultant residue was dried in vacuo over sodium hydroxide to yield 1.0 g. of a light yellow-gold solid, M.P. 196–200° C. IR and NMR analysis of this solid was consistent with the structure of the title compound, 3 - amino-4-hydroxy-8-methyl-7-[3-O-5-methyl-2-pyrrolylcarbonyl)noviosyloxy]coumarin. The material is recrystallized and used for the preparation of compounds having the Formula I. The product gives a sky-blue Ninhydrin test. It is sensitive to oxidation, particularly when in solution.

*Analysis.*—Calc'd for $C_{24}H_{28}O_9N_2$: C, 59.01; H, 5.79; N, 5.74. Found: C, 58.39; H, 6.02; N, 5.70.

*Analysis.*—Calc'd for $C_{24}H_{28}O_9N_2 \cdot \frac{1}{2}H_2O$: C, 57.94; H, 5.88; N, 5.63.

EXAMPLE 6

3-amino-4-hydroxy-8-methyl-7-[3-O-(5-methyl-2-pyrrolylcarbonyl)-noviosyloxy]coumarin. (Palladium catalyst)

3 - carbobenzoxamido - 4 - hydroxy-methyl-7-[3-O-5-methyl-2-pyrrolylcarbonyl)noviosyloxy]coumarin (2.0 g., 3.22 mmoles), obtained from Example 4, was dissolved in 200 ml. of glacial acetic acid. To this solution was added 500 mg. of 30% palladium on diatomaceous earth, and the hydrogenation was conducted on a Parr hydrogenation apparatus as in Example 5.

The reduction was run for 24 hours at 25° C. and the hydrogen uptake was 8.4 lbs./in.² The product was worked up in an identical manner to that used in Example 5 to yield about 1.4 g. of solid material that was identical in every respect with that obtained in Example 5.

EXAMPLE 7

3-benzamido-4-hydroxy-8-methyl-7-[3-O-5-methyl-2-pyrrolylcarbonyl)noviosyloxy]coumarin

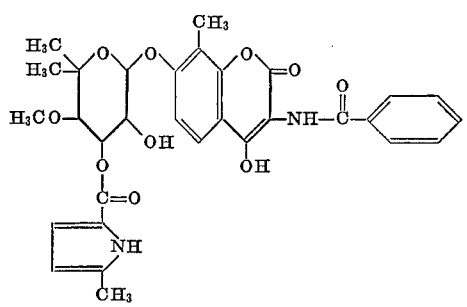

3 - amino - 4 - hydroxy-8-methyl-7-[3-O-(5-methyl-2-pyrrolycarbonyl)noviosyloxy]coumarin (250 mg., 0.51 mmole), obtained from Example 5, was dissolved in 10 ml. of pyridine.

To this solution was added benzoic anhydride (139 mg., 0.613 mmole) with vigorous stirring at 25° C. The reaction was stirred at room temperature for a total of 70 hours under a $N_2$ atmosphere and then poured into 150 ml. of ice water containing 20 ml. of 6 N hydrochloric acid. The mixture was stirred for one hour and the precipitate colleced by vacuum filtration to yield 253 mg. of a light peach-colored solid that was identified as 3-benzamido - 4 - hydroxy - 8 - methyl-7-[3-O-(5-methyl-2- pyrrolylcarbonyl)noviosyloxy]coumarin, M.P.: tans and softens ~ 190° C., browns beginning at 210° C., finally decomposes vigorously at 230–235° C. (turns black). Staph. aureus assay 44 μg./mg.

Analysis.—Calc'd for $C_{31}H_{32}O_{10}N_2$: C, 62.83; H, 5.45; N, 4.73. Found: C, 63.49; H, 5.78; N, 4.43.

EXAMPLE 8

3 - carbobenzoxamido - 4 - hydroxy-8-methyl-7-[3-O-(5-methyl - 2 - pyrrolylcarbonyl)noviosyloxy]coumarin. (Alternate-direct procedure)

Monosodium coumermycin $A_1$ (60 g., 0.053 mole) is dissolved in 1500 ml. of 6:1 THF-triethylamine to which solution is added dropwise and with rapid stirring five equivalents (36 ml.) of benzyl chloroformate. The temperature of the solution is gradually raised to reflux temperatures for several hours. One-half the solvent is removed in vacuo and replaced by an equal amount of pyridine. The solution is warmed overnight. The bulk of the solvent evaporated in vacuo and the resultant syrup poured into 3000 ml. of rapidly stirred ice-water. The pH of the mixture is adjusted to pH 1–2 with 6 N hydrochloric acid, stirred for an additional hour and the tan precipitate collected by filtration. The precipitate is washed well with water, air dried, dried in vacuo and the whole subsequently extracted by chloroform in a Soxhlet extraction apparatus to yield product identical in every way to the 3 - carbobenzoxamido - 4 - hydroxy-8-methyl-7[3-O-(5-methyl - 2 - pyrrolycarbonyl)noviosyloxy]coumarin obtained in Example 4.

EXAMPLE 9

Bis-carbobenzoximide of coumermycin $A_2$

Substitution in the procedure of Examples 1, 2 or 3 for the coumermycin $A_1$ or coumermycin $A_1$-tetrahydropyranyl ethers used therein of coumermycin $A_2$ or coumerycin $A_2$-tetrahydropyranyl ether produces the bis-carbobenzoximide of coumermycin $A_2$.

EXAMPLE 10

3-carbobenzoxamido-4-hydroxy-8-methyl-7-[3-O-(2-pyrrolylcarbonyl)noviosyloxy]coumarin Substitution in the procedure of Example 4 for the bis-carbobenzoximide of coumermycin $A_1$ used therein of the bis-carbobenzoximide of coumermycin $A_2$ produces 3-carbobenzoxamido - 4 - hydroxy - 8 - methyl-7-[3-O-(2-pyrrolylcarbonyl)noviosyloxy]coumarin.

EXAMPLE 11

3-amino-4-hydroxy-8-methyl-7-[3-O-(2-pyrrolylcarbonyl)noviosyloxy]coumarin

Substitution in the procedure of Example 5 or 6 for the 3 - carbobenzoxamido - 4 - hydroxy-8-methyl-7-[3-O-(5-methyl - 2 - pyrrolylcarbonyl)noviosyloxy]coumarin used therein of 3-carbobenzoxamido-4-hydroxy-8-methyl-7-[3-O-(2 - pyrrolylcarbonyl)noviosyloxy]coumarin produces 3 - amino-4-hydroxy-8-methyl-7-[3-O-(2-pyrrolylcarbonyl)noviosyloxy]coumarin.

EXAMPLE 12

Bis-4-nitrocarbobenzoximide of coumermycin $A_1$

Substitution in the procedure of Examples 1, 2 or 3 for the benzyl chloroformate used therein of 4-nitrobenzyl chloroformate produces the bis-4-nitrocarbobenzoximide of coumermycin $A_1$.

EXAMPLE 13

3-(4-nitrocarbobenzoxamido)-4-hydroxy-8-methyl-7-[3-O-(5-methyl-2-pyrrolylcarbonyl)noviosyloxy/coumarin Substitution in the procedure of Example 4 for the bis-carbobenzoximide of coumermycin $A_1$ used therein of the bis-4-nitrocarbobenzoximide of coumermycin $A_1$ produces 3-(4-nitrocarbobenzoxamido)-4-hydroxy-8-methyl-7-[3-O-(5 - methyl - 2 - pyrrolylcarbonyl)noviosyloxy]coumarin.

EXAMPLE 14

3-amino-4-hydroxy-8-methyl-7-[3-O-(5-methyl-2-pyrrolylcarbonyl)noviosyloxy]coumarin Substitution in the procedure of Examples 5 or 6 for the 3-carbobenzoxamido - 4 - hydroxy-8-methyl-7-[3-O-(5-methyl - 2 - pyrrolylcarbonyl)noviosyloxy]coumarin used therein of 3-(4-nitrocarbobenzoxamido)-4-hydroxy-8-methyl-7-[3-O-(5-methyl - 2 - pyrrolylcarbonyl)noviosyloxy]coumarin produces 3-amino-4-hydroxy-8-methyl-7-[3-O-(5 - methyl - 2 - pyrrolylcarbonyl)noviosyloxy]coumarin.

EXAMPLE 15

3-amino-4-hydroxy-8-methyl-7-[3-O-(5-methyl-2-pyrrolylcarbonyl)noviosyloxy]coumarin hydrochloride Two grams of 3-amino-4-hydroxy-8-methyl-7-[3-O-(5-methyl - 2 - pyrrolylcarbonyl)noviosyloxy]coumarin, obtained from Example 5, is dissolved in anhydrous ether-ethyl acetate. To this solution is added dropwise, and with vigorous stirring, 20 ml. of anhydrous ether saturated with hydrogen chloride gas. A white precipitate forms immediately and is collected by vacuum filtration in a dry nitrogen atmosphere. The precipitate is washed several times with dry ether and then dried in vacuo to yield the desired 3-amino-4-hydroxy-8-methyl-7-[3-O-(5-methyl - 2 - pyrrolylcarbonyl)noviosyloxy]coumarin hydrochloride.

EXAMPLE 16

Tetrahydropyranyl ether of 3-amino-4-hydroxy-8-methyl-7-[3-O-(5-methyl - 2 - pyrrolylcarbonyl)-noviosyloxy] coumarin.

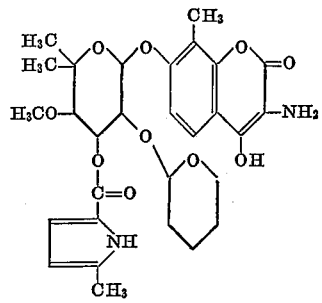

A solution of 15.0 g. of tetrahydropyranylcoumermycin $A_1$ in 350 ml. of freshly-distilled pyridine was treated with 7.0 g. of benzyl chloroformate. The reaction mixture was protected from the atmosphere and stirred at 25° C. for 30 hours. The mixture was concentrated in vacuo at 40° C. to 50 ml. of dark orange-brown syrup. It was poured into 1.00 liter of water with vigorous stirring. The resulting tetrahydropyranyl bis-imide suspension is stirred at 0° C. for 2.0 hours and the amorphous solid filtered off. The total crude product is dissolved in 1200 ml. of pyridine at 25° C. to make a light orange-colored solution. It is warmed to 50–55° C. for 24 hours during which time it is stirred.

The resultant orange-brown solution is concentrated in vacuo to about one-fifth its original volume and is poured into 3000 ml. of ice water with vigorous stirring.

The suspension is filtered to yield light cream-tan colored solids which are dried in vacuo to constant weight.

The tetrahydropyranyl-carbobenzoxamido derivative is quite chloroform soluble while the undesired side products are not. The whole solids are placed in a Soxhlet extraction apparatus and continuously extracted until the materials extracted from the whole became negligible. Evaporation of the chloroform extracts produces a solid residue. This residue is redissolved in a small portion of chloroform and extracted with 5% aqueous sodium bicarbonate to remove any acidic impurities. The chloroform solution is dried over anhydrous sodium sulfate and fractionally precipitated from solution by the addition of increasing amounts of Skellysolve-B (petroleum solvent, B.P. 60–68° C., essentially n-hexane) to yield a purified fraction of the tetrahydropyranyl ether of 3-carbobenzoximido-4-hydroxy - 8-methyl-7-[3-O-(5-methyl-2-pyrrolylcarbonyl)noviosyloxy]coumarin.

The tetrahydropyranyl ether of the 3-carbobenzoxamido - 4-hydroxy-8-methyl-7-[3-O-(5-methyl-2-pyrrolylcarbonyl)noviosyloxy]coumarin is dissolved in 150 ml. of glacial acetic acid or benzene to produce a pale yellow solution. To this solution is added 500 mg. of platinum oxide catalyst and the resultant solution-suspension is treated with hydrogen in a Parr hydrogenation apparatus at an initial pressure of 52.5 lb./in.$^2$. The reduction is run for about 24 hours at room temperature with agitation.

The catalyst is removed by filtration over a filter-aid pad under a nitrogen atmosphere, and the solution is immediately evaporated in vacuo. Twenty ml. of acetone is added to the residue and it is again evaporated to dryness in vacuo. The procedure is repeated several times. The resultant residue is dried in vacuo over sodium hydroxide to yield the tetrahydropyranyl ether of 3-amino-4 - hydroxy - 8 - methyl-7-[3-O-(5-methyl-2-pyrrolylcarbonyl)noviosyloxy]coumarin.

EXAMPLE 17

3-amino-4-hydroxy-methyl-7-[3-O-(5-methyl - 2 - pyrrolylcarbonyl)noviosyloxy]coumarin via the tetrahydropyranyl ether The tetrahydropyranyl ether of 3-amino-4-hydroxy-8-methyl-7-[3-O-(5-methyl - 2 - pyrrolylcarbonyl)noviosyloxy]coumarin obtained in Example 16 is dissolved in a mixture of acetone and methanol which contains a small quantity of 2,2-dimethoxypropane and p-toluenesulfonic acid. The clear yellow-orange solution is stirred at room temperature for about 20 hours and then evaporated in vacuo to yield an oily residue. The residue is dissolved in chloroform, washed with 5% NaHCO$_3$ solution, dried over Na$_2$SO$_4$ and taken to dryness in vacuo. Recrystallization from acetone-Skellysolve B produces crystalline title compound.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. A compound having the formula

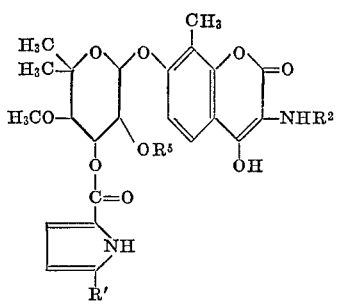

wherein
R' is either hydrogen or methyl,
R$^2$ is either hydrogen or a radical having the formula

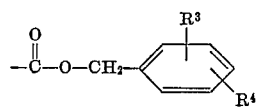

in which R$^3$ and R$^4$ are alike or different and each represent hydrogen, fluoro, chloro, bromo, cyano, (lower)alkyl, (lower)alkoxy or nitro, and R$^5$ is either hydrogen or

and when R$^2$ is hydrogen, the stable acid addition salts thereof.

2. A compound of claim 1 having the formula

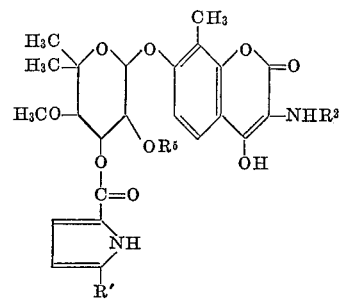

wherein
R' is either hydrogen or methyl,
R$^2$ is either hydrogen or a radical having the formula

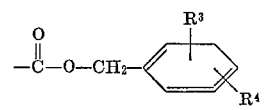

in which R$^3$ and R$^4$ are alike or different and each represent hydrogen or nitro, and R$^5$ is either hydrogen or

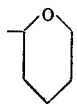

and when R$^2$ is hydrogen, the stable acid addition salts thereof.

3. A compound of claim 1 having the formula

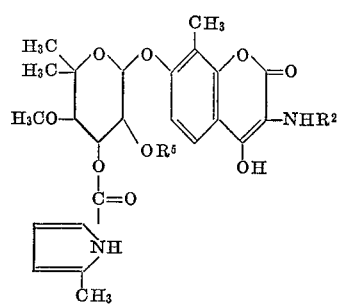

wherein
R$^2$ is either hydrogen or a radical having the formula

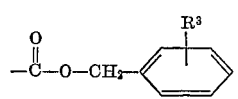

in which R$^3$ represents hydrogen or nitro, and R$^5$ is either hydrogen or

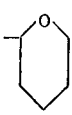

and when R$^2$ is hydrogen, the stable acid addition salts thereof.

4. A compound of claim 1 having the formula

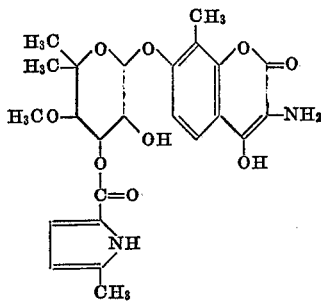

and the stable, acid addition salts thereof.

5. A compound of claim 1 having the formula

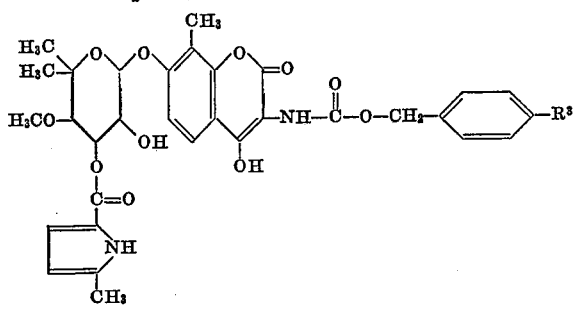

wherein R³ is either hydrogen or nitro.

6. A compound having the formula

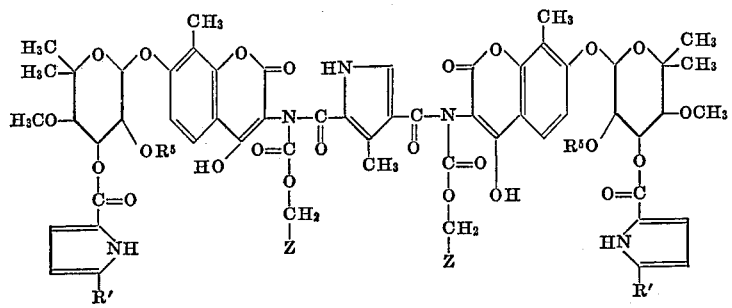

wherein
R' is either hydrogen or methyl, and
Z is a group having the formula

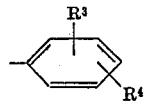

in which R³ and R⁴ are alike or different and each represent hydrogen, fluoro, chloro, bromo, cyano, (lower)alkyl, (lower)alkoxy or nitro, and R⁵ is either hydrogen or

7. A compound of claim 6 having the formula

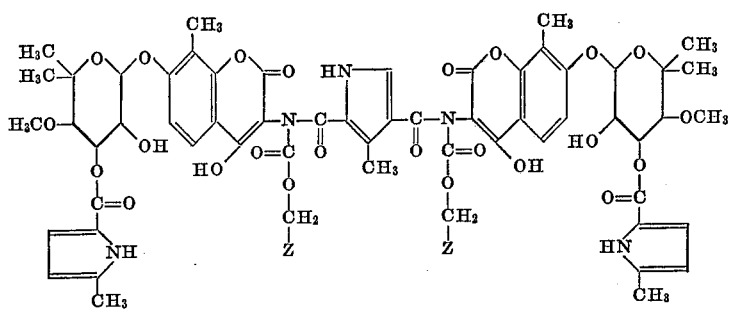

wherein
Z is a group having the formula

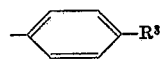

in which R³ is hydrogen or nitro.

8. The process which comprises the consecutive steps of
(a) mixing together as compound having the formula

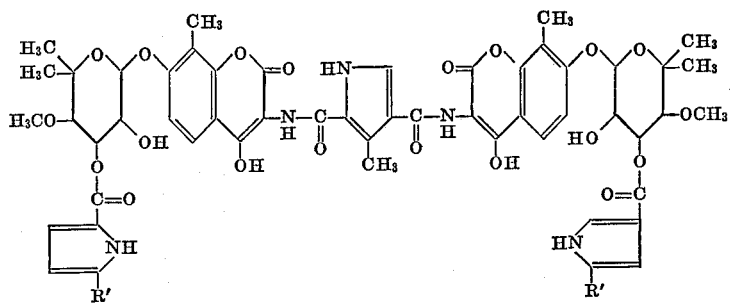

or a cationic salt or tetrahydropyranyl ether thereof, wherein R' is hydrogen or methyl,
with a benzyl haloformate having the formula

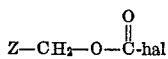

wherein hal is chloro, bromo or iodo, and Z is a group having the formula

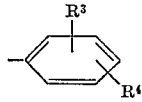

in which $R^3$ and $R^4$ are alike or different and each represent hydrogen, fluoro, chloro, bromo, nitro, cyano, (lower)alkyl, or (lower)alkoxy
to produce a compound characterized as a bis-imide having the formula

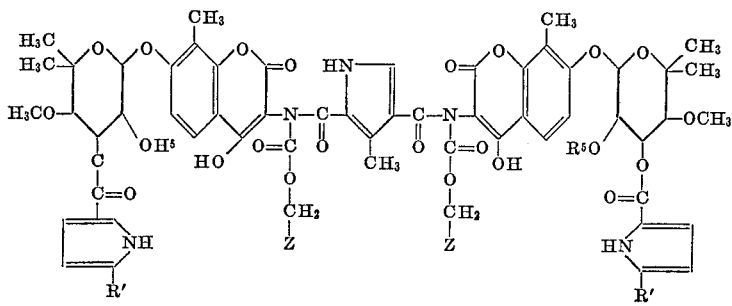

wherein R' and Z are as described above; and $R^5$ is either hydrogen or

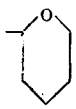

and
(b) warming said isolated bis-imide in the presence of a proton-accepting solvent
to produce a 3-carbobenzoxamido compound having the formula

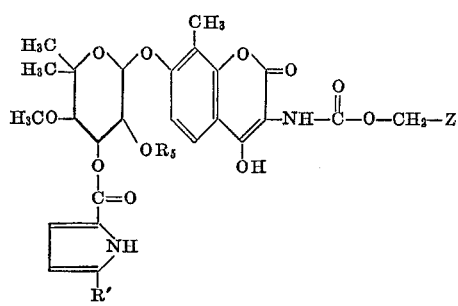

wherein $R^5$, R' and Z are as described above; and (c) catalytically hydrogenating the isolated 3-carbobenzoxamido compound
to produce a compound having the formula

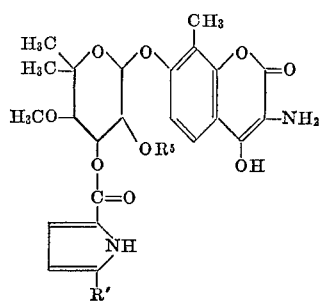

wherein $R^5$ and R' is as described above; and the stable acid addition salts thereof.

9. The process of claim 8 which comprises the consecutive steps of
(a) mixing together a compound having the formula

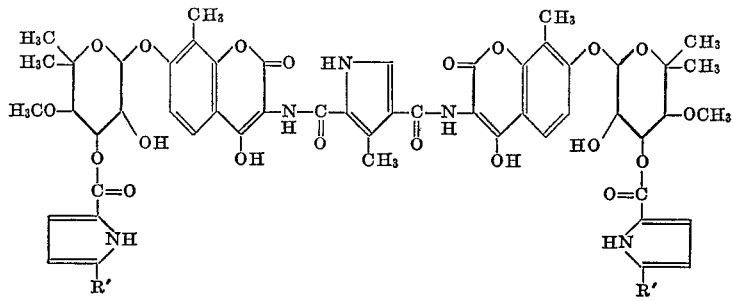

or a cationic salt or tetrahydropyranyl ether thereof, wherein R' is hydrogen or methyl,
with a benzyl haloformate having the formula

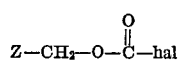

wherein hal is chloro or bromo, and Z is a group having the formula

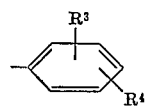

in which $R^3$ and $R^4$ are alike or different and each represent hydrogen, fluoro, chloro, bromo, nitro, cyano, (lower)alkyl or (lower)alkoxy,
to produce a compound characterized as a bis-imide having the formula

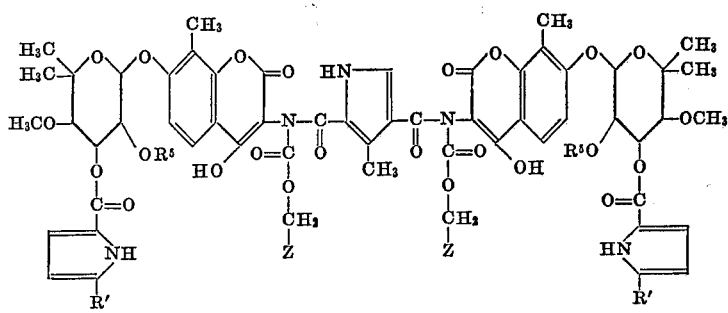

wherein R' and Z are as described above; and R⁵ is either hydrogen or

wherein R⁵ and R' is as described above; and the stable acid addition salts thereof.

10. The process of claim 8 which comprises the consecutive steps of
(a) mixing together a compound having the formula

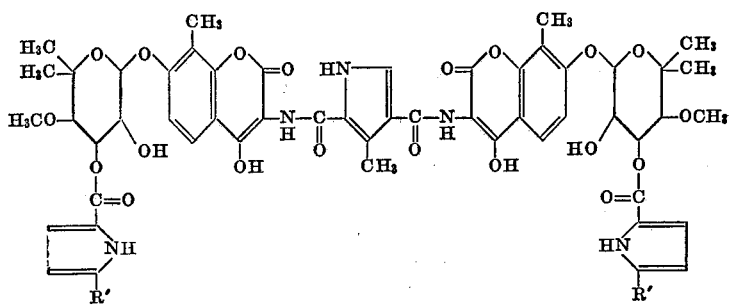

or a cationic salt or tetrahydropyranyl ether thereof wherein R' is hydrogen or methyl with a benzyl with a benzyl chloroformate having the formula

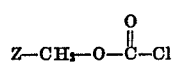

wherein Z is a group having the formula

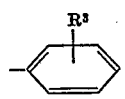

in which R³ is hydrogen or nitro,
in a homogeneous or heterogeneous system capable of inactivating protons, said system comprising an inorganic or organic base selected from the group consisting of an alkali carbonate or bicarbonate, alkali earth metal carbonate or bicarbonate, a pyridine or a tri(lower)alkylamine, alone or in combination with an inert solvent selected from the group consisting of tetrahydrofuran, benzene, toluene, xylene, ether and chloroform,
at a temperature in the range of −20° C. to 50° C.,
to produce a compound characterized as a bis-imide having the formula and
(b) warming said isolated bis-imide in the presence of a proton accepting solvent selected from the group consisting of a pyridine, or (lower)trialkylamine
to produce a 3-carbobenzoxamido compound having the formula

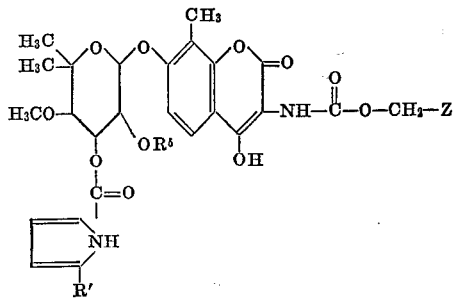

wherein R⁵, R' and Z are as described above; and
(c) catalytically hydrogenating the isolated 3-carbobenzoxamido compound using a metal catalyst to produce a compound having the formula

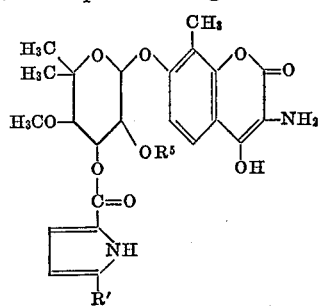

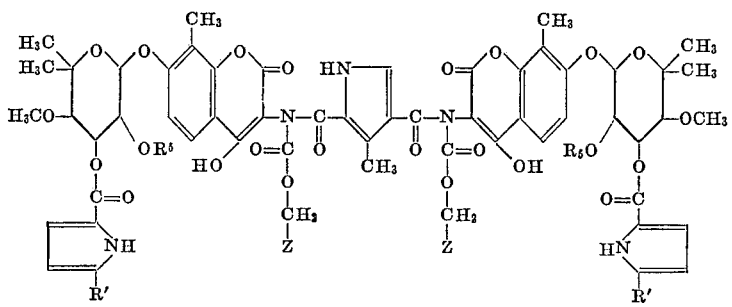

wherein R' and Z are as described above; and $R^5$ is either hydrogen or

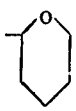

and
(b) warming said isolated bis-imide in the presence of a proton accepting solvent selected from the group consisting of a pyridine or (lower)trialkylamine, alone or in combination with an inert solvent selected from the group consisting of tetrahydrofuran, benzene, toluene, xylene, ether and chloroform,
at a temperature in the range of 30° C. to the boiling point of the solvent system,
for a period of time of about two to fifty hours, hydrogen is absorbed to produce a compound having the formula

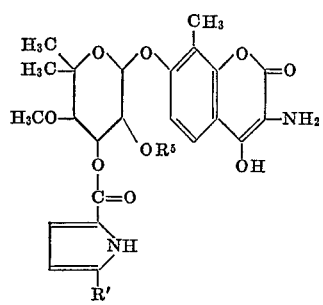

wherein $R^5$ and R' is described as above; and the stable addition salts thereof.

11. The process of claim 8 which comprises the consecutive steps of
(a) mixing together a compound having the formula

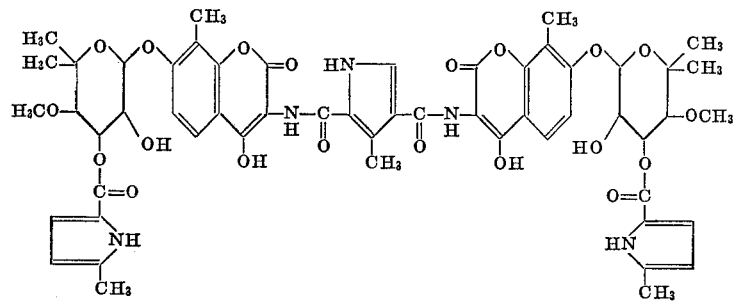

to produce a 3-carbobenzoxamido compound having the formula

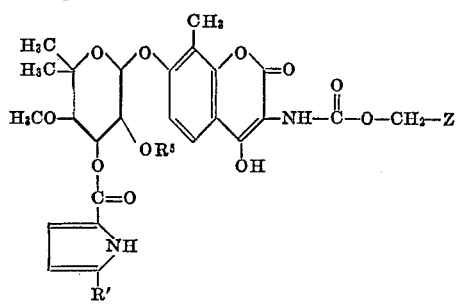

wherein $R^5$, R' and Z are as described above; and
(c) catalytically hydrogenating the isolated, purified 3-carbobenzoxamido compound using a metal catalyst,
hydrogen at a pressure in the range of about 1 lb./in.² to 300 lb./in.².
at a temperature of about 0° C. to about 50° C. in a suitable solvent for hydrogenation, with agitation, until at least the theoretical amount of or a cationic salt with a benzyl chloroformate having the formula

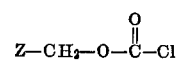

wherein Z is a group having the formula

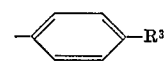

in which $R^3$ is hydrogen or nitro,
in a homogeneous system capable of inactivating protons, said system comprising an organic base selected from the group consisting of tri(lower) alkylamines, alone or in combination with an inert solvent selected from the group consisting of tetrahydrofuran, benzene, toluene, xylene, ether, chloroform,
at a temperature in the range of about —5° C. to about 35° C.
to produce a compound characterized as a bis-imide having the formula

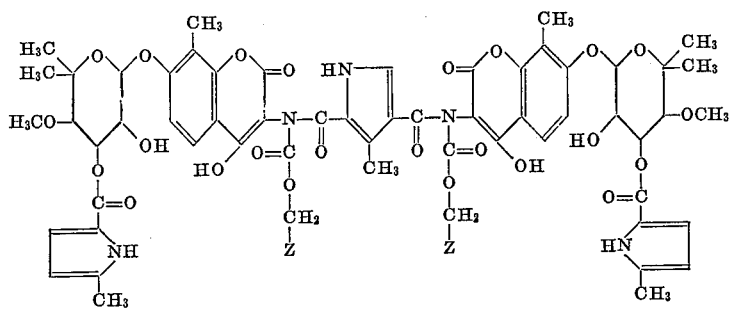

wherein Z is as described above; and
(b) warming said isolated bis-imide in the presence of a proton accepting solvent selected from the group consisting of a pyridine, alone or in combination with an inert solvent selected from the group consisting of tetrahydrofuran, benzene, toluene, xylene, ether and chloroform,
at a temperature in the range of about 35° C. to about 70° C.,
for a period of about five to twenty-five hours,
to produce a 3-carbobenzoxamido compound having the formula

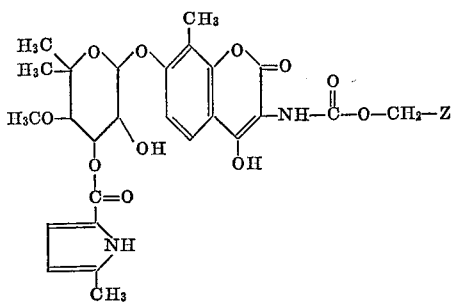

wherein Z is as described above; and
(c) catalytically hydrogenating the isolated, purified 3-carbobenzoxamido compound using platinum oxide or palladium oxide catalyst, hydrogen at a pressure in the range of about 25 lb./in.$^2$ to about 75 lb./in.$^2$
at a temperature of about 15° C. to about 35° C.
in glacial acetic acid, with agitation, until the theoretical amount of hydrogen is absorbed
to produce a compound having the formula

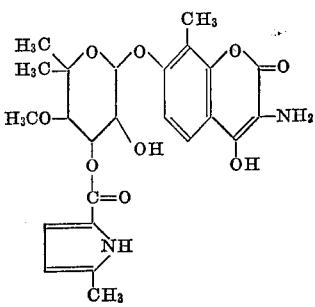

and the stable, acid addition salts thereof.

References Cited
UNITED STATES PATENTS 3,201,386  8/1965  Kawaguchi et al.
3,268,511  8/1966  Kiss et al. _____ 260—234

LEWIS GOTTS, Primary Examiner.
JOHNNIE R. BROWN, Assistant Examiner.

U.S. Cl. X.R.
99—2; 195—80; 260—999

UNITED STATES PATENT OFFICE
CERTIFICATE OF CORRECTION

Patent No. 3,454,548                                            July 8, 1969

John G. Keil et al.

It is certified that error appears in the above identified patent and that said Letters Patent are hereby corrected as shown below:

Column 20, lines 46 to 58, that portion of the formula reading

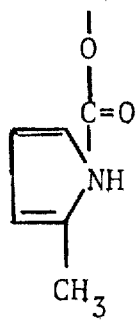      should read      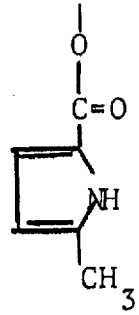

Column 22, line 46 "as" should read -- α --; lines 47 to 65, that portion of the formula reading:

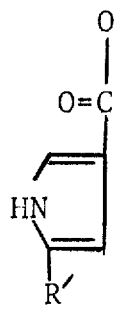      should read      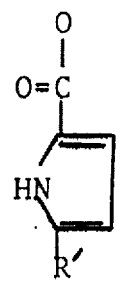

Column 23, lines 19 to 33, that portion of the formula reading:

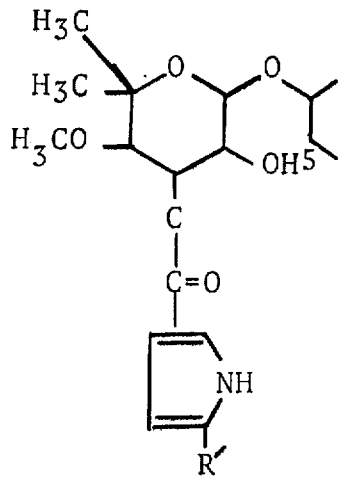      should read      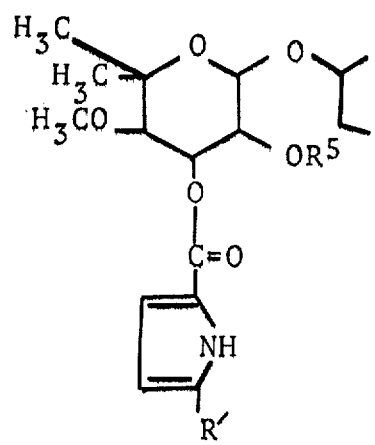

Column 26, line 41, "wherein R' is hydrogen or methyl with a benzyl" should read -- wherein R' is hydrogen or methyl --.

Signed and sealed this 24th day of March 1970.

(SEAL)
Attest:

EDWARD M. FLETCHER, JR.  
Attesting Officer

WILLIAM E. SCHUYLER, JR.  
Commissioner of Patents